(12) United States Patent
van Rensburg et al.

(10) Patent No.: US 8,179,834 B2
(45) Date of Patent: May 15, 2012

(54) METHOD AND APPARATUS FOR ADAPTING DOWNLINK WIRELESS TRANSMISSION BETWEEN BEAMFORMING AND TRANSMIT DIVERSITY ON A PER MOBILE STATION BASIS

(75) Inventors: Cornelius van Rensburg, Dallas, TX (US); Joseph R. Cleveland, Murphy, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1644 days.

(21) Appl. No.: 10/992,798

(22) Filed: Nov. 19, 2004

(65) Prior Publication Data

US 2006/0126519 A1    Jun. 15, 2006

(51) Int. Cl.
*H04B 7/216* (2006.01)

(52) U.S. Cl. ...... 370/320; 375/148; 455/504; 455/562.1

(58) Field of Classification Search .................. 370/280, 370/320, 333, 335, 390; 455/442, 504, 522, 455/562, 562.1; 375/148
See application file for complete search history.

(56) References Cited

U.S. PATENT DOCUMENTS

| | | | |
|---|---|---|---|
| 5,812,935 A * | 9/1998 | Kay | 370/333 |
| 5,870,681 A * | 2/1999 | Myer | 455/562.1 |
| 5,999,560 A * | 12/1999 | Ono | 375/148 |
| 6,108,565 A | 8/2000 | Scherzer | |
| 6,122,260 A * | 9/2000 | Liu et al. | 370/280 |
| 6,141,335 A * | 10/2000 | Kuwahara et al. | 370/342 |
| 6,233,466 B1 | 5/2001 | Wong et al. | |
| 6,249,251 B1 * | 6/2001 | Chang et al. | 375/144 |
| 6,307,849 B1 * | 10/2001 | Tiedemann, Jr. | 370/335 |
| 6,320,853 B1 | 11/2001 | Wong et al. | |
| 6,330,460 B1 | 12/2001 | Wong et al. | |
| 6,347,234 B1 * | 2/2002 | Scherzer | 455/562.1 |
| 6,415,149 B1 * | 7/2002 | Bevan et al. | 455/442 |
| 6,501,747 B1 | 12/2002 | Friedlander et al. | |
| 6,801,790 B2 * | 10/2004 | Rudrapatna | 455/562.1 |
| 7,016,399 B1 * | 3/2006 | Vadgama et al. | 375/148 |
| 7,058,116 B2 * | 6/2006 | Moshavi et al. | 375/148 |
| 7,061,971 B2 * | 6/2006 | Ulupinar et al. | 375/148 |
| 7,069,052 B2 * | 6/2006 | Ylitalo | 455/562.1 |
| RE39,275 E * | 9/2006 | Chang et al. | 375/260 |
| 7,340,282 B2 * | 3/2008 | Park et al. | 455/562.1 |
| 7,403,748 B1 * | 7/2008 | Keskitalo et al. | 455/67.11 |
| 7,450,632 B2 * | 11/2008 | Lim | 375/148 |
| 2001/0031647 A1 * | 10/2001 | Scherzer et al. | 455/562 |
| 2002/0072384 A1 * | 6/2002 | Chheda | 455/522 |
| 2002/0122397 A1 * | 9/2002 | Ling et al. | 370/335 |
| 2002/0128027 A1 | 9/2002 | Wong et al. | |
| 2002/0193146 A1 * | 12/2002 | Wallace et al. | 455/562 |
| 2003/0100324 A1 * | 5/2003 | Kasapi | 455/504 |
| 2003/0142732 A1 * | 7/2003 | Moshavi et al. | 375/148 |

(Continued)

OTHER PUBLICATIONS

Cornelius van Rensburg, et al., "Transmit Diversity for Arrays with Correlated Rayleigh Fading", 2000 IEEE, p. 301-305.

(Continued)

*Primary Examiner* — Ricky Ngo
*Assistant Examiner* — Phuongchau B Nguyen

(57) ABSTRACT

A transmitting apparatus is provided for a base station capable of communicating with a plurality of mobile stations in a wireless network. The transmitting apparatus includes a beamforming traffic path for use in beamforming transmission to one of the mobile stations, and a diversity traffic path for use in diversity transmission to the mobile station. A selector is coupled to the beamforming traffic path and the diversity traffic path for dynamically selecting which of the traffic paths is used for transmission to the mobile station.

20 Claims, 9 Drawing Sheets

U.S. PATENT DOCUMENTS

| | | | |
|---|---|---|---|
| 2003/0146870 A1* | 8/2003 | Guo et al. | 342/383 |
| 2004/0008757 A1* | 1/2004 | Ulupinar et al. | 375/148 |
| 2004/0120300 A1* | 6/2004 | Saquib | 370/342 |
| 2004/0196893 A1* | 10/2004 | Oh et al. | 375/148 |
| 2004/0240532 A1* | 12/2004 | Reznik et al. | 375/148 |
| 2006/0030366 A1* | 2/2006 | Park et al. | 455/562.1 |
| 2006/0034279 A1* | 2/2006 | Cho et al. | 370/390 |
| 2007/0064641 A1* | 3/2007 | Laroia et al. | 370/320 |

OTHER PUBLICATIONS

Robert A. Soni, et al., "Transmit Beamforming Combined with Diversity Techniques for CDMA2000 Systems", 2001 IEEE, p. 1029-1032.

Robert A. Soni, et al., "Intelligent Antenna System for cdma2000", IEEE Signal Processing Magazine, Jul. 2002, p. 54-67.

* cited by examiner

METHOD AND APPARATUS FOR ADAPTING DOWNLINK WIRELESS TRANSMISSION BETWEEN BEAMFORMING AND TRANSMIT DIVERSITY ON A PER MOBILE STATION BASIS

TECHNICAL FIELD OF THE INVENTION

The present invention is directed, in general, to wireless networks and, more specifically, to wireless networks capable of beamforming and transmit diversity in the forward link.

BACKGROUND OF THE INVENTION

Business and consumers use a wide variety of fixed and mobile wireless terminals, including cell phones, pagers, Personal Communication Services (PCS) systems, and fixed wireless access devices (i.e., vending machine with cellular capability). Wireless service providers continually try to create new markets for wireless devices and expand existing markets by making wireless devices and services cheaper and more reliable. To attract new customers, wireless service providers implement new services, especially digital data services that, for example, enable a user to browse the Internet or send and receive e-mail.

Many of these new services are made possible by the use of smart antenna arrays that transmit data from a base station to a mobile station (i.e., downlink or forward link transmission) using beamforming techniques. Beamforming focuses a transmit beam in the direction of a selected mobile station and, therefore, uses much less power than conventional transmission techniques that broadcast the data in all directions at equal strength. Moreover, since the beam is focused towards a selected mobile station, the signal power is greatly reduced in other directions, thereby reducing signal interference in other mobile stations. Some systems attempt to maximize the antenna gain through beamforming, which can be optimal for some transmission environments.

Another approach to forward link transmission is the use of space-time coding to achieve diversity transmissions. Some systems attempt to maximize diversity gain through the use of space-time codes, which can be optimal for some transmission environments.

Therefore, there is a need in the art for an improved capability of adapting forward link transmissions to a variety of transmission environments. In particular, there is a need in the art for a method and a related apparatus that are capable of dynamically adapting between beamforming and diversity transmission in the forward link.

SUMMARY OF THE INVENTION

To address the above-discussed deficiencies of the prior art, it is a primary object of the present invention to provide, for use in a wireless network comprising a plurality of base stations capable of communicating with a plurality of mobile stations in a coverage area of the wireless network, a transmitting apparatus associated with a first of the plurality of base stations. According to an exemplary embodiment of the present invention, the transmitting apparatus comprises: 1) a beamforming traffic path for use in beamforming transmission to one of the mobile stations; 2) a diversity traffic path for use in diversity transmission to the one mobile station; and 3) a selector coupled to the beamforming traffic path and the diversity traffic path for dynamically selecting which of the traffic paths is used for transmission to the one mobile station.

According to one embodiment of the present invention, the selector is for dynamically selecting which of the traffic paths is used for transmission in response to information indicative of an RF scattering environment.

According to another embodiment of the present invention, the RF scattering environment information includes reverse link RAKE information associated with the one mobile station.

According to still another embodiment of the present invention, the RAKE information includes relative sizes of a plurality of RAKE fingers.

According to yet another embodiment of the present invention, the selector is for selecting the beamforming traffic path when the RAKE information indicates less than three significant RAKE fingers.

According to a further embodiment of the present invention, the selector is for selecting the diversity traffic path when the RAKE information indicates more than two significant RAKE fingers.

According to a still further embodiment of the present invention, the RF scattering environment information includes reverse link angle of arrival information associated with the one mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
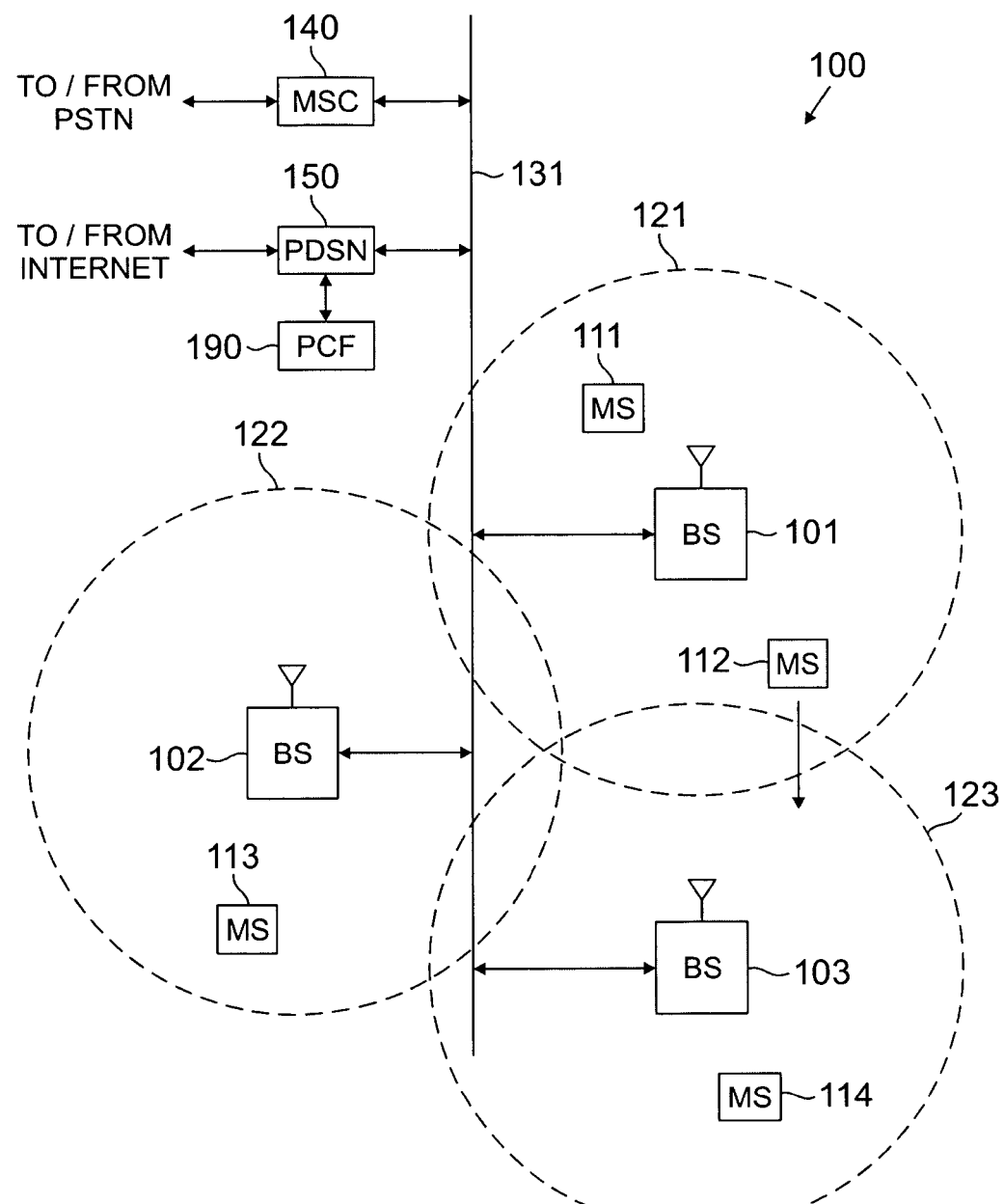
FIG. 1 illustrates an exemplary wireless network which can adapt between forward link beamforming and transmit diversity on a per mobile station basis according to the principles of the present invention.

FIG. 1 illustrates exemplary wireless network 100, which dynamically adapts between beamforming and diversity transmission in the forward link in accordance with the principles of the present invention. Wireless network 100 comprises a plurality of cell sites 121-123, each containing one of the base stations, BS 101, BS 102, or BS 103. In an exemplary embodiment, base stations 101-103 communicate with a plurality of mobile stations (MS) 111-114 over code division multiple access (CDMA) channels according to the CDMA standards (e.g., IS-95, CDMA2000). Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass the exemplary types of mobile stations described above, as well as portable devices such as, for example, vehicle-mounted wireless devices.

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments of the present invention may position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In an exemplary embodiment of the present invention, communications line 131 may be several different data links where each data link couples one of BS 101, BS 102 or BS 103 to MSC 140.

In the embodiment of wireless network 100 shown in FIG. 1, MS 111 and MS 112 are located in cell site 121 and communicate with BS 101. MS 113 is located in cell site 122 and communicates with BS 102 and MS 114 is located in cell site 123 and communicates with BS 103. MS 112 is located close to the edge of cell site 123 and moves in the direction of cell site 123, as indicated by the direction arrow proximate MS 112. At some point, as MS 112 moves into cell site 123 and out of cell site 121, a handoff will occur.

As is well known to those skilled in the art, the handoff procedure transfers control of a call from a first cell to a second cell. A handoff may be either a soft handoff or a hard handoff. In a soft handoff, a connection is made between the mobile station and the base station in the second cell before the existing connection is broken between the mobile station and the base station in the first cell. In a hard handoff, the existing connection between the mobile station and the base station in the first cell is broken before a new connection is made between the mobile station and the base station in the second cell.

As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft handoff process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft handoff assumes the mobile station is in a voice or data call. An idle handoff is the hand-off between cell sites of a mobile station that is communicating in the control or paging channel.

Figure 2:
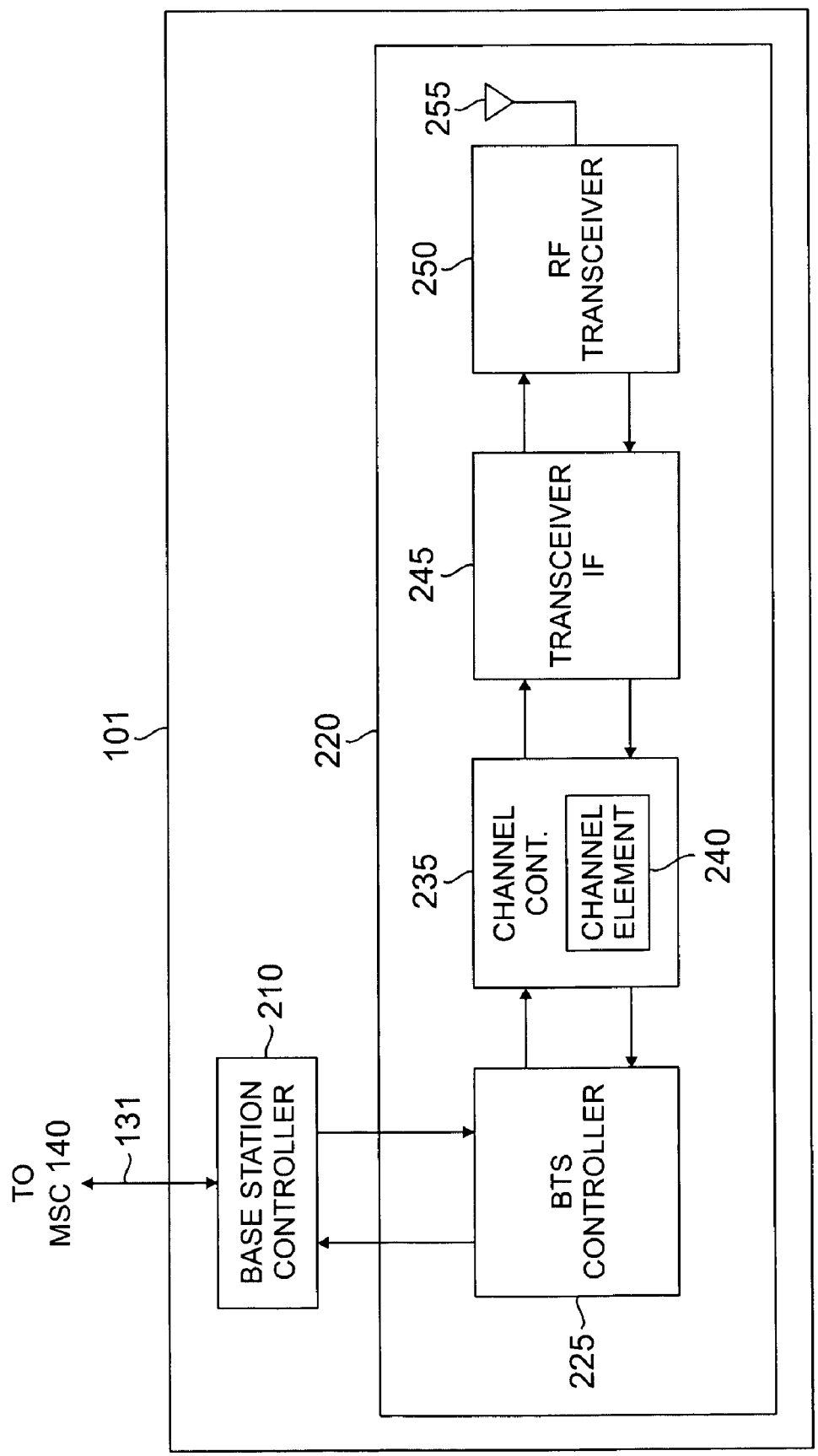
FIG. 2 illustrates an exemplary base station according to one embodiment of the present invention.

FIG. 2 illustrates exemplary base station 101 in greater detail according to an exemplary embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 120 comprises BTS controller 225, channel controller 235 (which contains representative channel element 240), transceiver interface (IF) 245, RF transceiver unit 250, and antenna array 255.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A forward channel refers to outbound signals from the base station to the mobile station and a reverse channel refers to inbound signals from the mobile station to the base station. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 101. Antenna array 255 also sends to transceiver 250 reverse channel signals received from mobile stations in the coverage area of BS 101. In a preferred embodiment of the present invention, antenna array 255 is multi-sector antenna, such as a three-sector antenna in which each antenna sector is responsible for transmitting and receiving in a 120° arc of coverage area. Additionally, transceiver 250 may contain an antenna selection unit to select among different antennas in antenna array 255 during both transmit and receive operations.

An exemplary embodiment of the Dual Adaptive Smart Antenna (DASA) system according to the invention may adapt the forward link between a conventional beamformer and a space time coding (STC) transmit diversity system, thus maximizing both antenna gain as well as diversity gain. Note that transmit diversity is implemented in the forward link of both CDMA2000 and WCDMA, by using 2×2 Alamouti STC codes.

The primary input to the algorithm is the number and size of RAKE fingers as determined by the RAKE receiver, and the corresponding Angles of Arrivals (AOAs) as determined by any suitable direction finding method. The scattering environment is evaluated based on the number and size of RAKE fingers. If there is only one significant RAKE finger, it may be assumed that there is very little multipath and beamforming should be optimal. When there are many RAKE fingers of equal or nearly equal strength, it could be assumed that this is a rich RF scattering environment, and thus transmit diversity would be optimal. In one example, the system counts the number and power of RAKE fingers and takes the following action:

Situation 1—If there is only one significant RAKE finger, one beam (using all antenna elements in the array) is formed in the corresponding direction (the AOA) as determined by any suitable direction finding method. The example used here assumes a Smart Antenna array of four elements per panel; however, the invention is applicable to any Smart Antenna array structure, and is not limited to four elements per panel. When multiple RAKE fingers are observed, but only one AOA is observed, a single 4 element beam is formed in the AOA direction. This scenario is known as a 'keyhole', where even if a rich scattering environment exists around the mobile, all the energy received at the base station arrives from a particular direction, typically caused by an urban canyon, such as a big road surrounded by tall buildings.

Situation 2—If two significant RAKE fingers are present corresponding to two very different angles of arrival, the system forms a single (in this example, a 4 element) beam that is phase matched to the pilot at the two AOAs.

Situation 3—When the number of significant RAKE fingers increases above 2 and the mobile indicates (e.g., in the CHANNEL CAPABILITY INFORMATION RECORD) that it can support STS, the system should switch on a diversity pilot (if not switched on already for another mobile) and start transmitting STS symbols to that particular mobile.

Any Smart Antenna array topology may be used with the DASA. In some cases, different topologies may result in improved performance.

The three different situations mentioned above will now be described in more detail for the example of a four element per panel antenna array.

Situation 1—All 4 elements are used to form a single beam that is phase matched to the pilot in the required (AOA) direction. The full antenna gain of 6 dB is therefore realized.

Situation 2—When two significantly different AOAs of approximately equal power are detected, a single, 4 element beam is formed, and it is phase matched to the pilot at both of the AOAs. This will typically realize less than 6 dB gain.

Situation 3—When STS is used, a first beam is formed using only first and second adjacent antenna elements to match a first pilot, while a second beam is formed using third and forth adjacent antenna elements to match a second (diversity) pilot. It is possible in this situation to get 3 dB array gain in addition to some diversity gain. In the case of a rich scattering environment, no beams will be formed, so no antenna gain is possible, but full diversity gain is achieved.

Figure 3A:
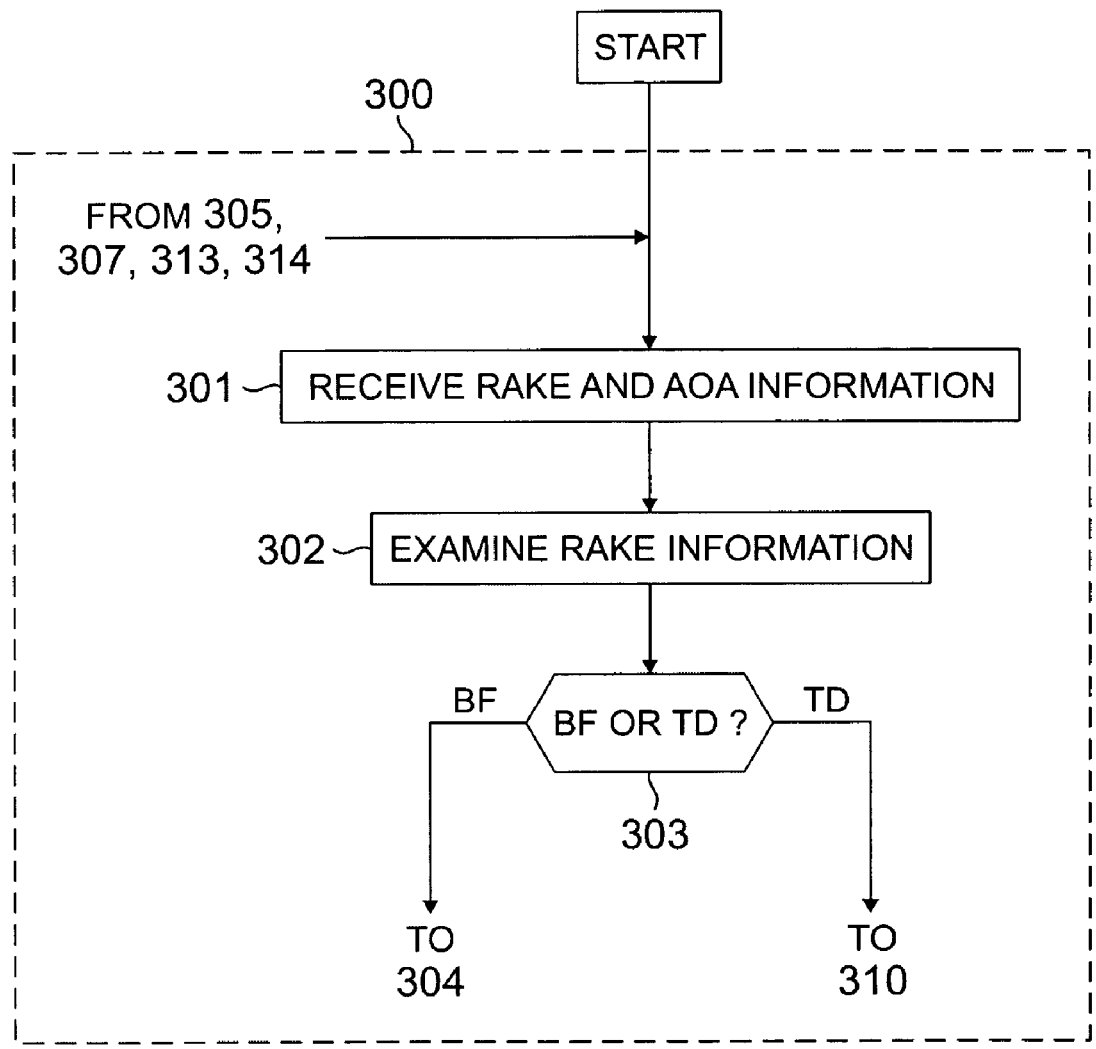
FIGS. 3A-3C are flow diagrams illustrating adaptation between forward link beamforming and transmit diversity according to the principles of the present invention.
Figure 3B:
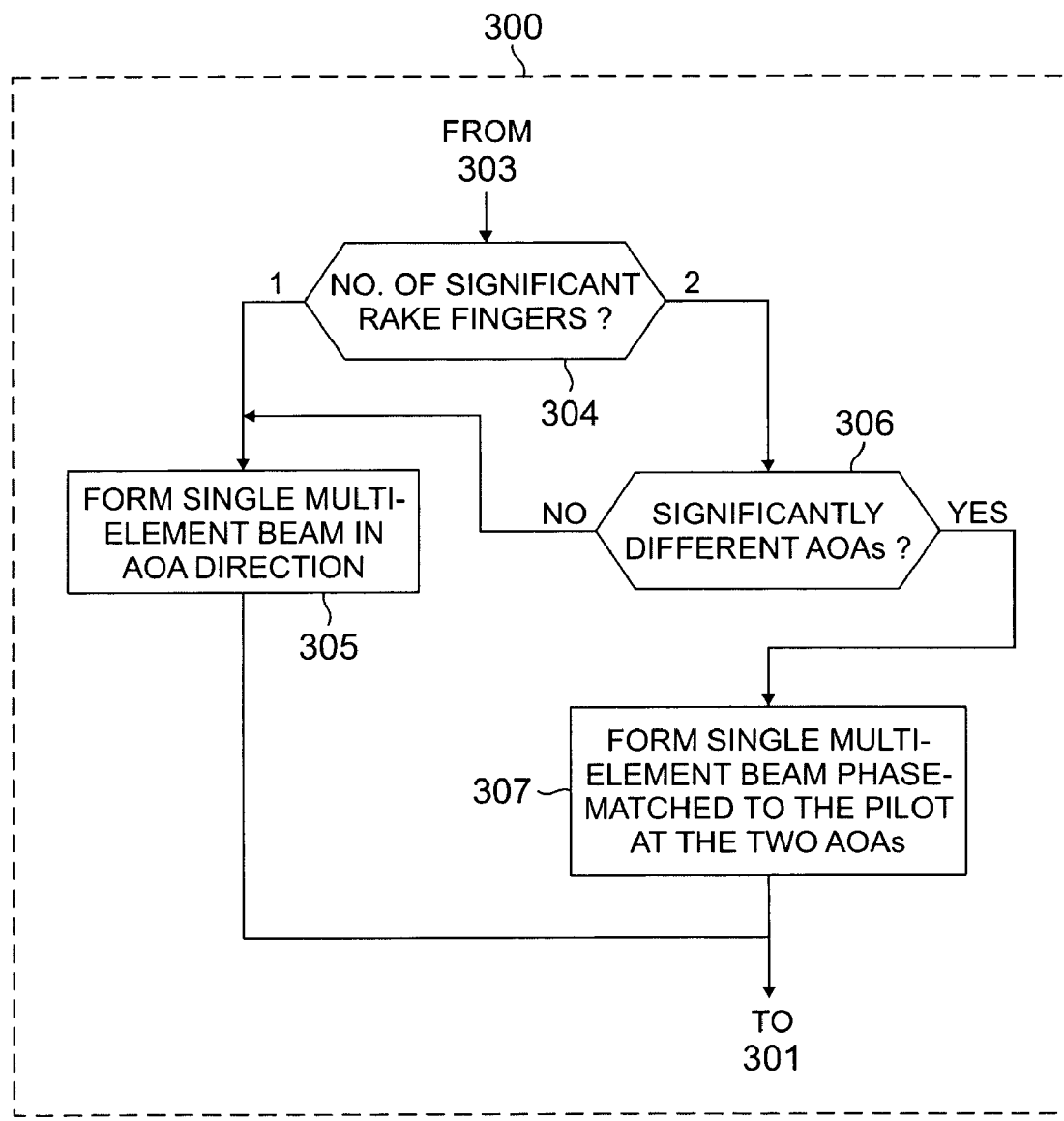
Figure 3C:
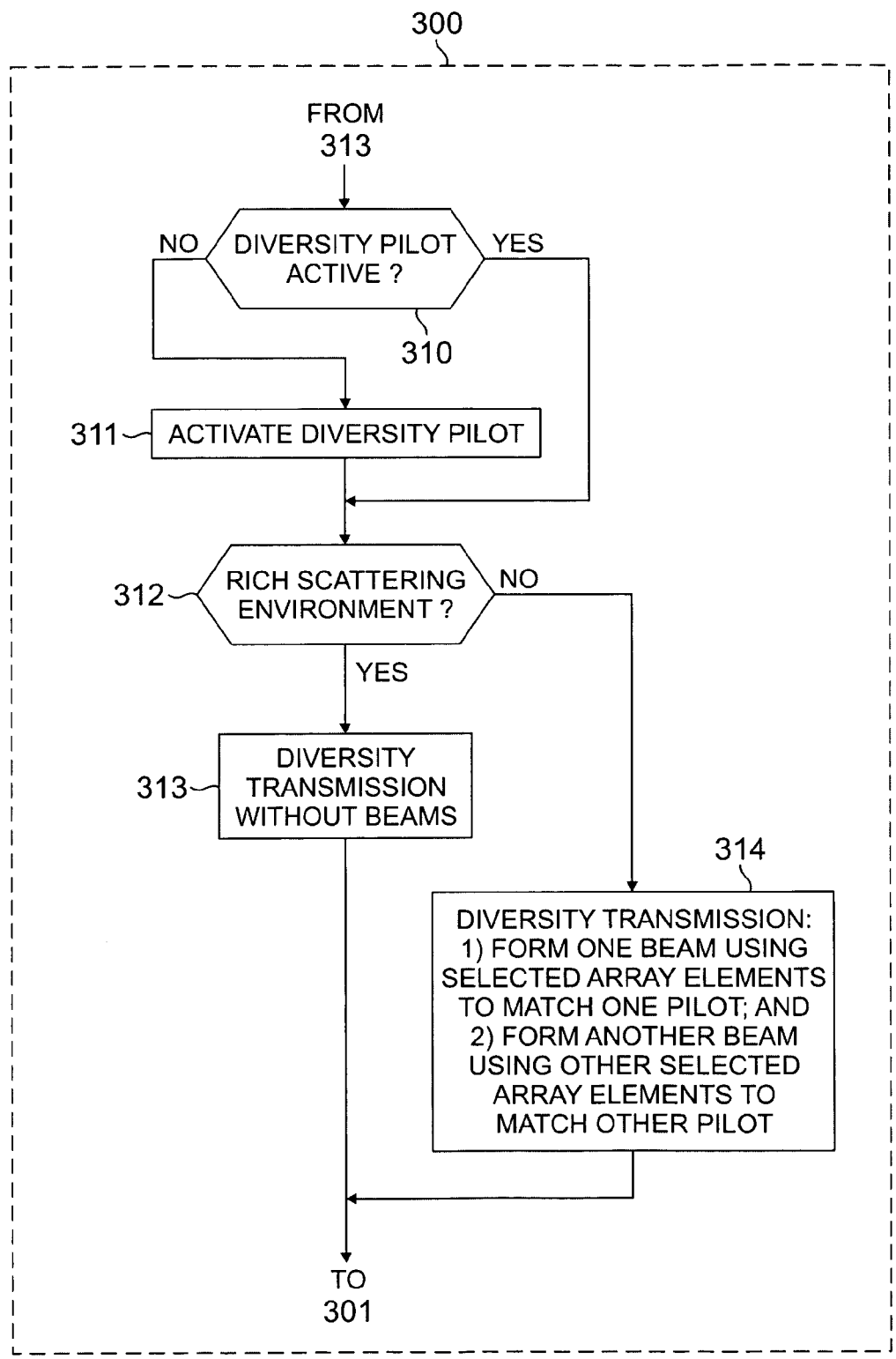

FIGS. 3A-3C depict flow diagram 300, which illustrates adaptation between forward link beamforming and transmit diversity according to the principles of the present invention. Initially, the base station (e.g., BS 101) receives RAKE and AOA information (process step 301). The RAKE information is then examined (process step 302). Based on the examination of the RAKE information, the selection of either beamforming (BF) or transmit diversity (TD) is made, for example, according to the decision criteria described above (process step 303).

FIG. 3B illustrates operations which are performed if beamforming is selected at process step 303 in FIG. 3A. The base station determines if there is only one significant RAKE finger or if there are two or more significant RAKE fingers (process step 304). If there is only one significant RAKE finger, then a single, multi-element beam is formed in the AOA direction (process step 305). Thereafter, operations return to process step 301 in FIG. 3A. If there are two significant RAKE fingers, then a determination is made whether the corresponding angle-of-arrivals (AOAs) are significantly different (process step 306). If not, then operations proceed to process step 305. If the AOAs are significantly different, then a single, multi-element beam is formed that is phase-matched to the pilot at the two AOAs (process step 307). Thereafter, operations return to process step 301 in FIG. 3A.

FIG. 3C illustrates operations which are performed If transmit diversity is selected at process step 303 in FIG. 3A. Initially, it is determined whether a diversity pilot is currently active (process step 310). If so, operations proceed to process step 312. If not, a diversity pilot is activated (process step 311), after which operations proceed to process step 312.

A determination is made whether there is a rich scattering environment (process step 312). If a rich scattering environment is detected, then diversity transmission without beams is implemented (process step 313). If a rich scattering environment is not detected, then diversity transmission with beamforming is implemented (process step 314). More specifically, diversity transmission is implemented by forming a first beam using selected antenna array elements (e.g., elements 416 and 417 in FIG. 4) to match one of the pilots and forming a second beam using other selected antenna array elements (e.g., elements 418 and 419 in FIG. 4) to match the other pilot.

Figure 4:
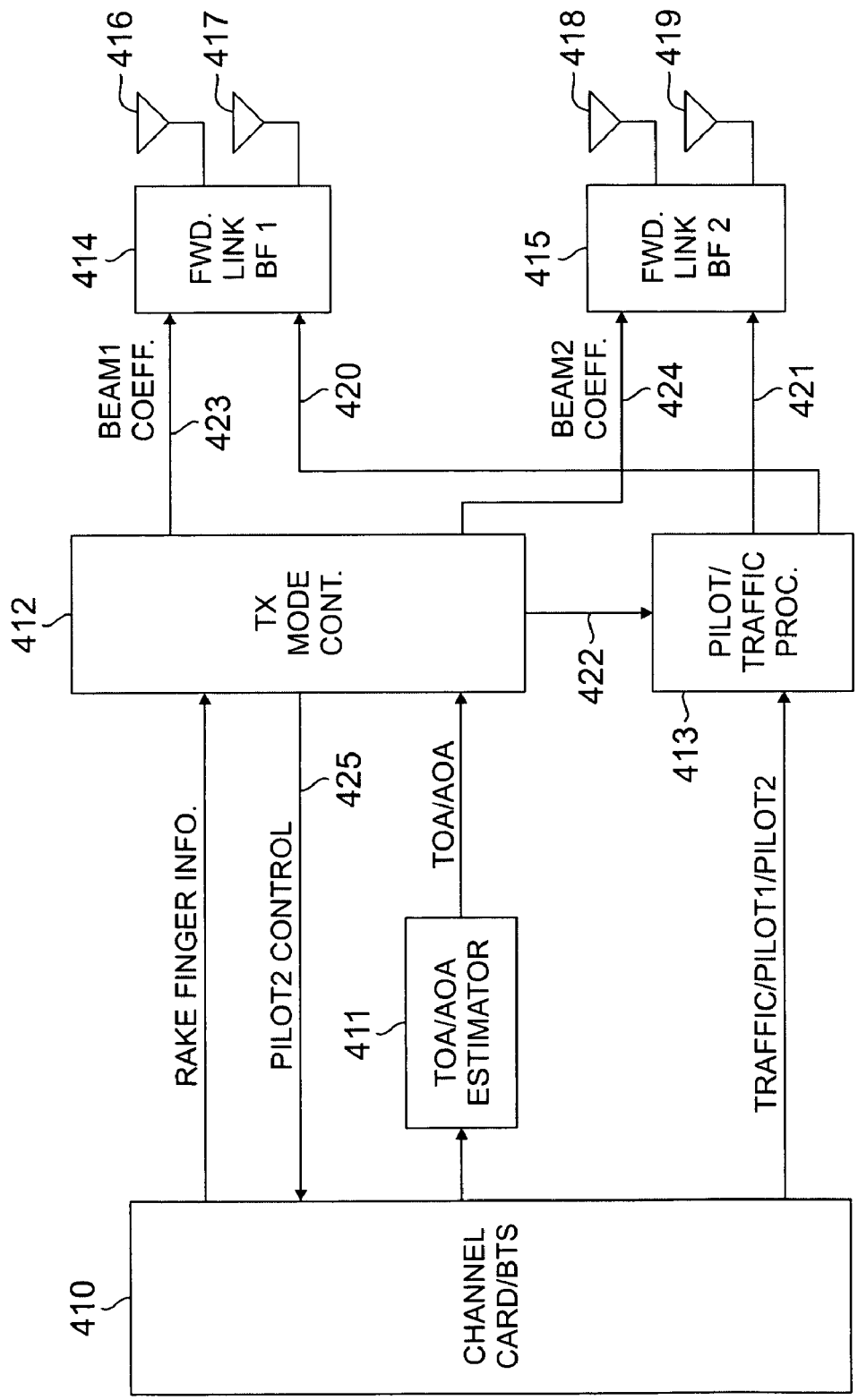
FIG. 4 illustrates a selected portion of the exemplary base station of FIG. 2 in more detail according to an exemplary embodiment of the invention.

FIG. 4 diagrammatically illustrates pertinent portions of exemplary BTS controller 225 of FIG. 2. The arrangement of FIG. 4 can perform the operations of FIGS. 3A-3C. In the example of FIG. 4, a BTS channel card 410 uses conventional techniques to provide reverse link RAKE finger information to a transmit mode controller 412. The BTS channel card 410 also cooperates with a TOA/AOA estimator 411 in conventional fashion to provide the transmit mode controller 412 with TOA/AOA information. The channel card 410 further outputs forward link traffic and pilot signals (pilot 1 and pilot 2) in conventional fashion. The forward link traffic and pilot signals are input to a pilot/traffic processor 413. The pilot/traffic processor 413 has a first traffic output 420 connected to a first forward link beam former 414, and has a second traffic output 421 connected to a second forward link beam former 415. The pilot/traffic processor receives control signals 422 from the transmit mode controller 412. The first beam former 414 receives first beam coefficients 423 from the transmit mode controller 412, and the second beam former 415 receives second beam coefficients 424 from the transmit mode controller 412. The first beam former 414 drives antenna array elements 416 and 417, and the second beam former 415 drives antenna array elements 418 and 419.

In response to the aforementioned RAKE finger information and AOA information, the transmit mode controller 412 provides suitable control signaling to the pilot/traffic processor 413 and the beamformers 414 and 415 to effectuate the forward link communications described above and illustrated at 305 and 307 in FIG. 3B and at 313 and 314 in FIG. 3C. In addition, the transmit mode controller 412 outputs a control signal 425 to the BTS channel card 410 in order to selectively activate a diversity pilot (pilot 2) as described above and illustrated generally at 311 in FIG. 3C.

Figure 5:
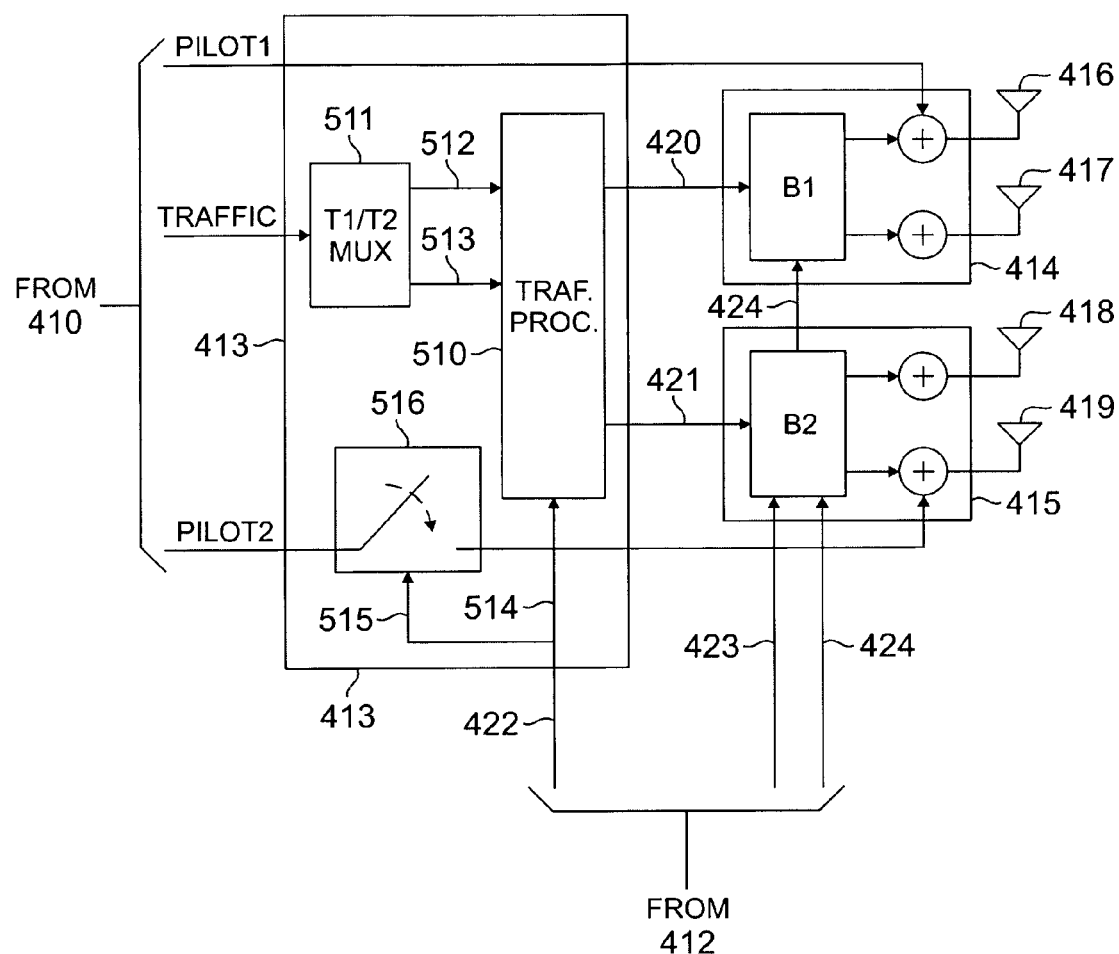
FIG. 5 illustrates a selected portion of FIG. 4 in more detail according to an exemplary embodiment of the invention.

FIG. 5 diagrammatically illustrates a more detailed example of the pilot/traffic processor 413 of FIG. 4. As shown in FIG. 5, one pilot signal (pilot 1) is always coupled to one of the antenna elements (416 in FIG. 5), and the second pilot signal (pilot 2) is selectively coupled to another of the antenna elements (419 in FIG. 5) when a diversity pilot signal is required. In the example of FIG. 5, pilot 1 and pilot 2 are respectively coupled to the pair of antenna elements 416 and 419 that are separated the most from one another and are thus the least correlated. A switching apparatus 516 can selectively couple pilot 2 to the antenna element 419. The switching apparatus 516 is controlled by a control signal 515 provided by the transmit mode controller 412 of FIG. 4.

The sequence of traffic symbols received from the BTS channel card 410 is switched by a multiplexer 511 such that the symbols of the sequence are applied to multiplexer outputs 512 and 513 in alternating fashion. That is, the first symbol (at time T1) is provided on output 512, the second symbol (at time T2) is provided on output 513, the third symbol in the sequence is provided on output 512, the fourth symbol is provided on output 513, etc. The outputs 512 and 513 serve as inputs to a traffic processor 510 which processes the input traffic in response to control signaling 514 received from the transmit mode controller 412 of FIG. 4. Traffic processor 510 produces traffic outputs 420 and 421 which, respectively serve as inputs to beamforming portions B1 and B2 of the respective beamformers 414 and 415.

Figure 6:
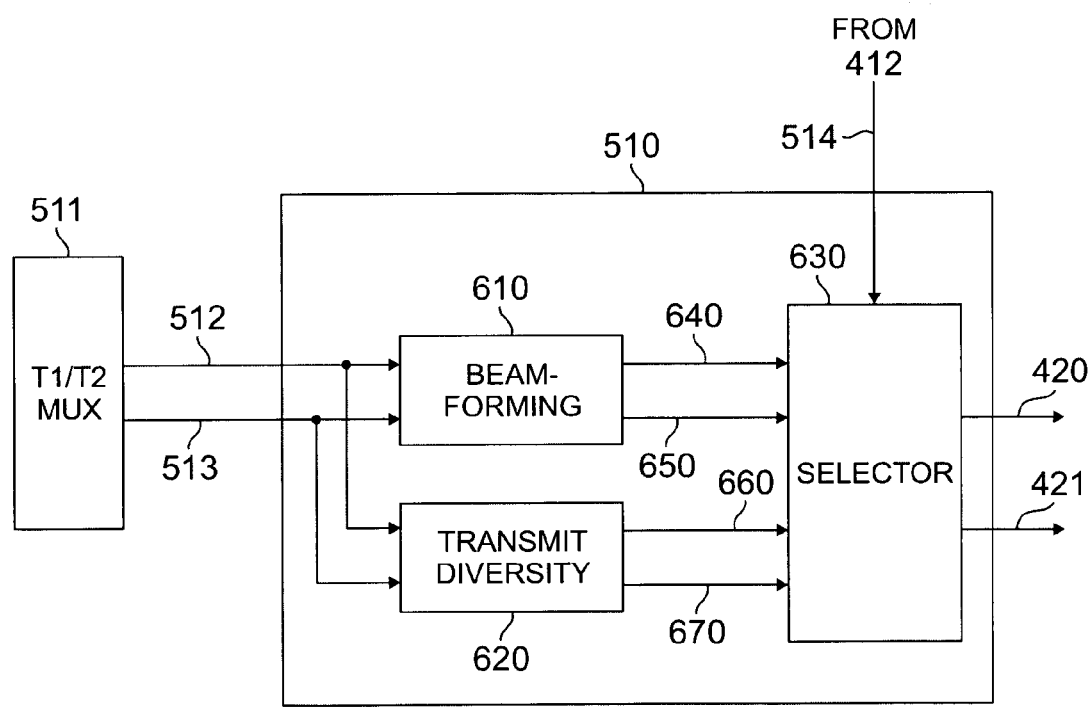
FIG. 6 illustrates a selected portion of FIG. 5 in more detail according to an exemplary embodiment of the invention.

FIG. 6 diagrammatically illustrates an example of the traffic processor 510 of FIG. 5 in more detail. As shown in FIG. 6, the traffic processor 510 includes a beamforming processing portion 610 and a transmit diversity processing portion 620. The beamforming processing portion 610 receives the traffic outputs 512, 513 from the multiplexer 511 and processes the traffic as required for beamforming operation. The beamforming processing portion 610 provides output traffic at outputs 640 and 650. These outputs 640 and 650 are selectively connectable to the outputs 420 and 421 of traffic processor 510 by operation of a selector 630 under control of the control signal 514 provided by the transmit mode controller 412.

The transmit diversity processing portion 620 processes the traffic from multiplexer 511 as required for transmit diversity operation. The transmit diversity processing portion 620 provides output traffic on outputs 660 and 670. These outputs 660 and 670 are selectively connectable to the traffic processor outputs 420 and 421 via operation of the selector 630.

Referring also to FIGS. 3A-3C, 4 and 5, when beamforming is selected at 303 in FIG. 3A, the control signal 514 from transmit mode controller 412 (FIG. 4) selects the outputs 640 and 650 of beamforming processing portion 610 for respective connection to the transmit processor outputs 420 and 421. Alternatively, when transmit diversity is selected at 303 in FIG. 3A, the control signal 514 from transmit mode controller 412 selects the outputs 660 and 670 of the transmit diversity processing portion 620 for respective connection to the traffic processor outputs 420 and 421.

Figure 7:
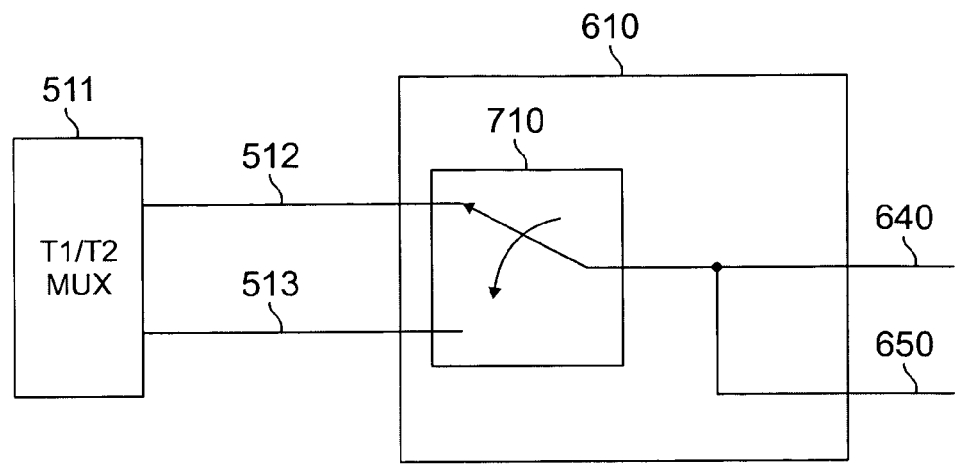
FIG. 7 illustrates a selected portion of FIG. 6 in more detail according to an exemplary embodiment of the invention.

FIG. 7 diagrammatically illustrates in more detail an example of the beamforming portion 610 of FIG. 6. A switch 710 operates synchronously with the transmit symbol clock such that the symbols at the outputs 512 and 513 of multiplexer 511 are re-serialized back into the original traffic symbol sequence that was received at the input of multiplexer 511 (see also FIG. 5). The resulting traffic symbol sequence is provided on both outputs 640 and 650 of the beamforming processing portion 610.

Figure 8:
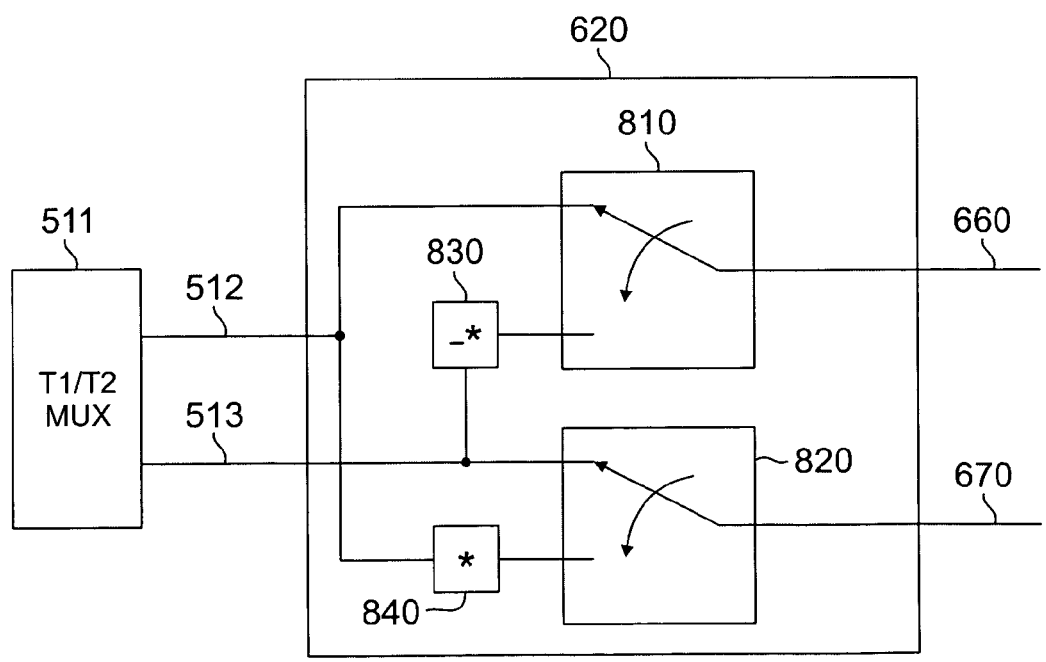
FIG. 8 illustrates another selected portion of FIG. 6 in more detail according to an exemplary embodiment of the invention.

FIG. 8 illustrates in more detail an example of the transmit diversity processing portion 620 of FIG. 6. In the example of FIG. 8, switches 810 and 820 operate synchronously with the transmit symbol clock. A negative complex conjugate apparatus 830 is connected between multiplexer output 513 and switch 810, and a complex conjugate apparatus 840 is connected between multiplexer output 512 and switch 820. The switches 810 and 820 operation such that, during alternate symbol clock cycles, the outputs 660 and 670 respectively receive either: the traffic symbols currently available at the multiplexer outputs 512 and 513; or the negative complex conjugate (see 830) of the traffic symbol currently available at multiplexer output 513 and the complex conjugate (see 840) of the traffic symbol currently available at multiplexer output 512.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network comprising a plurality of base stations capable of communicating with a plurality of mobile stations in a coverage area of said wireless network, a transmitting apparatus associated with a first of said plurality of base stations comprising:
a beamforming traffic path for use in beamforming transmission to one of the mobile stations;
a diversity traffic path for use in diversity transmission to said one mobile station; and
a selector coupled to said beamforming traffic path and said diversity traffic path configured to dynamically select which of said traffic paths is used for transmission to said one mobile station based on a number and size of RAKE fingers determined by a RAKE receiver and whether the number of RAKE fingers is above a first number of significant RAKE fingers or below a second number of significant RAKE fingers, and dynamically selecting said diversity traffic path without said beamforming traffic path if the size and the first number of significant RAKE fingers comprises a rich scattering environment.

2. The apparatus of claim 1, wherein said number of RAKE fingers includes reverse link RAKE information associated with said one mobile station.

3. The apparatus of claim 2, wherein said RAKE information includes relative sizes of said number of RAKE fingers.

4. The apparatus of claim 1, wherein said selector is for selecting said beamforming traffic path when said number of RAKE fingers is less than three significant RAKE fingers.

5. The apparatus of claim 1, wherein said selector is for selecting said diversity traffic path when said number of RAKE fingers is more than two significant RAKE fingers.

6. The apparatus of claim 1, wherein said selector is for selecting which of said traffic paths is used for transmission to said one mobile station based on reverse link angle of arrival information associated with said one mobile station.

7. The apparatus of claim 1, wherein said number of RAKE fingers indicates a specified number of significant RAKE fingers associated with said one mobile station, and wherein said selector is capable of selecting said beamforming traffic path when said specified number is less than three and selecting said diversity traffic path when said specified number is greater than two.

8. A wireless network comprising:
a plurality of base stations capable of communicating with a plurality of mobile stations in a coverage area of said wireless network; and
a transmitting apparatus associated with a first of said plurality of base stations comprising:
a beamforming traffic path for use in beamforming transmission to one of the mobile stations;
a diversity traffic path for use in diversity transmission to said one mobile station; and
a selector coupled to said beamforming traffic path and said diversity traffic path configured to dynamically select which of said traffic paths is used for transmission to said one mobile station based on a number and size of RAKE fingers determined by a RAKE receiver and whether the number of RAKE fingers is above a first number of significant RAKE fingers or below a second number of significant RAKE fingers, and dynamically selecting said diversity traffic path without said beamforming traffic path if the size and the first number of significant RAKE fingers comprises a rich scattering environment.

9. The wireless network of claim 8, wherein said number of RAKE fingers includes reverse link RAKE information associated with said one mobile station.

10. The wireless network of claim 9, wherein said RAKE information includes relative sizes of said number of RAKE fingers.

11. The wireless network of claim 8, wherein said selector is for selecting said beamforming traffic path when said number of RAKE fingers is less than three significant RAKE fingers.

12. The wireless network of claim 8, wherein said selector is for selecting said diversity traffic path when said number of RAKE fingers is more than two significant RAKE fingers.

13. The wireless network of claim 8, wherein said selector is for selecting which of said traffic paths is used for transmission to said one mobile station based on reverse link angle of arrival information associated with said one mobile station.

14. The wireless network of claim 8, wherein said number of RAKE fingers indicates a specified number of significant RAKE fingers associated with said one mobile station, and wherein said selector is capable of selecting said beamforming traffic path when said specified number is less than three and selecting said diversity traffic path when said specified number is greater than two.

15. For use in a base station of a wireless network, a method of transmitting from the base station to a mobile station, the method comprising the steps of:
dynamically selecting one of beamforming transmission and diversity transmission for use in transmitting to the mobile station based on a number and size of RAKE fingers determined by a RAKE receiver and whether the number of RAKE fingers is above a first number of significant RAKE fingers or below a second number of significant RAKE fingers; and
dynamically selecting said diversity traffic path without said beamforming traffic path if the size and the first number of significant RAKE fingers comprises a rich scattering environment.

16. The method of claim 15, wherein number of RAKE fingers includes reverse link RAKE information associated with the mobile station.

17. The method of claim 16, wherein said RAKE information includes relative sizes of said number of RAKE fingers.

18. The method of claim 15, wherein said dynamic selecting includes selecting beamforming transmission when said number of RAKE fingers is less than 3 significant RAKE fingers.

19. The method of claim 15, wherein said dynamic selecting includes selecting diversity transmission when said number of RAKE fingers is more than 2 significant RAKE fingers.

20. The method of claim 15, wherein said number of RAKE fingers indicates a specified number of significant RAKE fingers associated with the mobile station, and wherein the step of dynamically selecting comprises selecting beamforming transmission when the specified number is less than three and selecting diversity transmission when the specified number is greater than two.

* * * * *